United States Patent Office 3,035,018
Patented May 15, 1962

3,035,018
PRODUCTION OF HIGH MOLECULAR WEIGHT
DIHYDRIC PHENOLS AND RESINS
Herbert P. Price and William J. Belanger, Louisville, Ky.,
assignors to Devoe & Raynolds Company, Inc., Louisville, Ky., a corporation of New York
No Drawing. Filed Dec. 12, 1958, Ser. No. 779,858
14 Claims. (Cl. 260—47)

This invention relates to improvements in the production of high molecular weight polyhydric phenols, and also in the production of high molecular weight resins, and includes new processes of producing such products and the improved products so produced.

The improved products of the present invention are produced by the dehydrohalogenation reaction of (1) 1 mol of a dichlorohydrin ether of a polyhydric alcohol (2) one or more mols of a monochlorohydrin ether of hydroxyl alkyl and hydroxy-aliphatic ethers of dihydric phenols, and (3) a dihydric phenol without or with (4) a glycidyl chlorohydrin ether of a dihydric phenol, or with (3) dihydric phenol and (5) added epichlorohydrin, in the presence of an alkaline dehydrohalogenating agent.

Depending upon the proportions of the reagents, products are produced which may be high molecular weight dihydric phenols, or high molecular weight polymeric resins substantially free from epoxide groups, or high molecular weight epoxide resins. Where high molecular weight dihydric phenols are produced, they can advantageously be further reacted with epichlorohydrin to form high molecular weight epoxide resins.

In general, the proportions will be such that for each mol of the dichlorohydrin ether there will be 1 or more mols of the monochlorohydrin ether and 1 or more mols of the dihydric phenols. Thus, with 1 or more mols of the monochlorohydrin ether and 2 mols of dihydric phenol for each mol of dichlorohydrin ether, a high molecular weight dihydric phenol is produced. With 1 or more mols of monochlorohydrin ether and 1 mol of dihydric phenol for each mol of dichlorohydrin ether, a high molecular weight polymeric product is produced which tends to go to an indefinite length, but the molecular weight stays in a workable range due to decreased functionality caused by the presence of inactive chlorine, as hereinbefore pointed out.

When, for 1 mol of the dichlorohydrin ether, there is added 1 or more mols of the monochlorohydrin ether, 1 mol of dihydric phenol, and 1 mol of epichlorohydrin, an epoxide resin is produced.

The amount of alkaline dehydrohalogenating agent used is sufficient to effect dehydrohalogenation of the chlorohydrin ethers, and also to bring about reaction of the epichlorohydrin, when used, with the polyhydric phenol.

The dichlorohydrin ethers of the polyhydric alcohols can be readily prepared by reacting the polyhydric alcohol with epichlorohydrin in the presence of a condensation catalyst, advantageously of the BF₃ type, such as boron trifluoride ether complex or etherate. The reaction is an addition reaction between the epoxy group of the epichlorohydrin and the hydroxyl groups of the alcohol. In this reaction, no excess of epichlorohydrin is necessary in the formation of the chlorohydrin ethers and all or substantially all of the epichlorohydrin initially added to the polyhydric alcohol is caused to react therewith. The products are mainly dichlorohydrin ethers admixed with small amounts of monofunctional chlorohydrin ethers. Most of the chlorine of the chlorohydrin ethers is active chlorine, but some small amount is usually present as inactive chlorine, as hereinafter explained.

The polyhydric alcohols used in producing the dichlorohydrin ethers contain at least 2 hydroxyl groups, and may contain more than 2 hydroxyl groups. Polyhydric alcohols having a hydrocarbon chain between the two hydroxyl groups are advantageous in imparting an added aliphatic hydrocarbon element or residue into the dichlorohydrin ethers and in the final epoxide resins made therefrom. Among such alcohols are ethylene glycol, butanediol, pentanediol, diethylene glycol, triethylene glycol, hexanetriol, glycerol and various polyethylene glycols and polypropylene glycols, etc.

The polyhydric alcohols used in forming the chlorohydrin ethers include dihydroxyalkyl ethers of dihydric phenols, for example, the dihydroxyethyl ethers of bisphenol, resorcinol, etc.

Where the polyhydric alcohol contains more than 2 hydroxyl groups, the dichlorohydrin ethers will still contain one or more reactive hydroxyl groups in addition to the 2 chlorohydrin ether groups, e.g., a dichlorohydrin ether of a trihydric alcohol.

These dichlorohydrin ethers of polyhydric alcohols have the following general formula

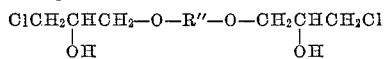

in which R'' is a divalent residue of the polyhydric alcohol.

The hydroxyalkyl or hydroxy-aliphatic ethers of dihydric phenols, from which the chlorohydrin ethers are prepared, can be readily prepared by reacting 1 mol of dihydric phenol with 1 mol of a simple or substituted alkyl or aliphatic chlorohydrin, using sodium hydroxide as the condensing or dehydrohalogenating agent; or by reacting 1 mol of dihydric phenol with 1 mol of a simple or substituted alkyl or aliphatic carbonate using potassium carbonate as the catalyst; or by reacting 1 mol of dihydric phenol with 1 mol of a simple or substituted aliphatic monoepoxide.

The formation of the hydroxyalkyl or hydroxyaliphatic ethers of a dihydric phenol is illustrated by the following equation, in which R is the aromatic nucleus of the dihydric phenol and R' is the radical of the simple or substituted alkyl group, including alkylether substituted alkyl groups, and which may be defined as a simple or substituted aliphatic divalent radical containing at least 2 carbon atoms selected from the group consisting of aliphatic hydrocarbon groups, hydroxy-substituted aliphatic hydrocarbon groups, hydrocarbon ether-substituted aliphatic hydrocarbon groups, and hydroxy-substituted hydrocarbon ethers of aliphatic hydrocarbon groups:

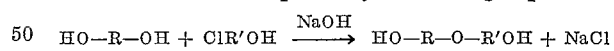

Examples of the hydroxyalkyl ethers are the hydroxyethyl ether of the dihydric phenol, such as bisphenol, in which R' is the —CH₂CH₂— group, which can readily be prepared by the reaction of ethylene chlorhydrin with a dihydric phenol with the use of caustic soda as the dehydrohalogenating agent. The use of glyceryl monochlorohydrin gives a hydroxy alkylether in which R' is the

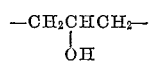

group, this being the dihydroxypropyl ether of the dihydric phenol.

In a similar manner, the use of other aliphatic chlorohydrins can be used to give other hydroxyalkyl or substituted hydroxyalkyl ethers of the dihydric phenols.

The dihydroxypropyl ether of the dihydric phenol can also be prepared by reacting 1 mol of the dihydric phenol with 1 mol of glycidol. And other monoepoxides can be similarly used to produce other hydroxyalkyl and substituted hydroxyalkyl derivatives. Thus, the use of phenyl glycide ether for reacting with the dihydric phenol gives a product in which the group R' in the above formula is —CH₂—CH—
    |
    CH₂
    \ /
     O
     |
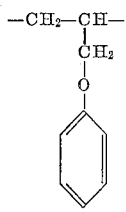

In this case, the alkyl group has a hydrocarbon ether substituent. Other simple or substituted hydroxyalkyl derivatives can be produced by the use of other monoepoxides such as ethylene oxide, butylglycidyl ether, isopropylglycidyl ether, styrene oxide, etc.

In addition to the simple and substituted hydroxyalkyl ethers, substituted in the alkyl group, somewhat more complex hydroxyalkl or hydroxy-aliphatic derivatives of the dihydric phenols can be produced by reacting 1 mol of the dihydric phenol with the monochlorohydrin ether of a mono-, di-, or trihydric alcohol, or by reacting 1 mol of the dihydric phenol with 1 mol of a monoglycide ether such as the monoglycide ethers of di-, tri-, or higher polyhydric alcohols. For example, 1 mol of the monoglycide ether of trimethylol propane can be reacted with 1 mol of a dihydric phenol such as bisphenol to form the corresponding hydroxy-containing monoether. Or 1 mol of the monochlorohydrin ether of trimethylol propane can be reacted with 1 mol of a dihydric phenol such as bisphenol to form the hydroxy-containing monoether. The resulting hydroxyalkyl or hydroxy-aliphatic ether of the dihydric phenol in this case will have a formula in which R' is the following group:

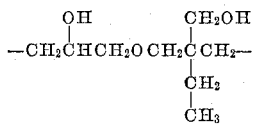

The hydroxyalkyl or hydroxy-aliphatic ethers of the dihydric phenols have both alcoholic hydroxyl and phenolic hydroxyl groups.

The monochlorohydrin ethers are produced by reacting 1 mol of the hydroxyalkyl ether or of the hydroxy-aliphatic ether of the dihydric phenol with 1 mol of epichlorohydrin in the presence of a condensation catalyst, and particularly a BF₃ catalyst such as a boron trifluoride ether complex or etherate, to form the chlorohydrin ether. This reaction of epichlorohydrin is with the alcoholic hydroxyl group, or with one of the alcoholic hydroxyl groups, leaving the phenolic hydroxyl group largely unreacted. This reaction is illustrated by the following equation, in which R and R' have the same meaning above indicated:

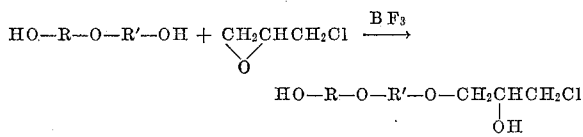

Such monochlorohydrin ethers have a free terminal phenolic hydroxyl which can react with epoxide groups by direct addition. The other end of the molecule of the monochlorohydrin ether is a chlorohydrin group which, on dehydrohalogenation, is converted to an epoxide group, which can react by direct addition with a phenolic hydroxyl group.

The dihydric phenols used are such as have heretofore been used in the production of epoxide resins by reaction with epichlorohydrin in the presence of caustic alkali, of which resorcinol, hydroquinone, and bisphenol (essentially p,p'-dihydroxy diphenyl dimethyl methane) are examples.

The glycidyl chlorohydrin ethers of dihydric phenols can readily be prepared by a reaction of a dihydric phenol in a large excess of epichlorohydrin with a basic catalyst such as benzyl trimethyl ammonium chloride (BTMaCl). The epichlorohydrin reacts with the phenolic hydroxyls, forming the chlorohydrin ethers. However, as the reaction progresses, the excess epichlorohydrin acts as an acceptor for the HCl of the chlorohydrin ether groups, with the resulting formation of glyceryl dichlorohydrin and the conversion of chlorohydrin ether groups to glycidyl ether groups. An equilibrium is finally reached wherein approximately one-half of the ether groups on the dihydric phenol are glycidyl groups and approximately one-half are chlorohydrin groups, thus giving a product which is a glycidyl-chlorohydrin ether of the dihydric phenol, which can be considered in whole or in part to have the following typical formula, in which R is the hydrocarbon residue of the dihydric phenol:

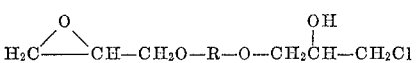

The resulting solution of the glycidyl chlorohydrin ether contains unreacted epichlorohydrin, glyceryl dichlorohydrin and mixed glycidyl-chlorohydrin ethers of dihydric phenols.

The excess epichlorohydrin and glyceryl dichlorohydrin can be distilled from the mixed glycidyl chlorohydrin ether of the dihydric phenol before it is used in the process. But the solution containing the excess epichlorohydrin and glyceryl dichlorohydrin can also be used. In this case, sufficient alkali is used to dehydrohalogenate the glyceryl dichlorohydrin as well as the chlorohydrin ether groups of the other reactants. Since the amount of glyceryl dichlorohydrin corresponds to the glycidyl groups of the glycidyl-chlorohydrin ether of the dihydric phenol, the amount of dehydrohalogenating agent is much the same as if a dichlorohydrin ether of a dihydric phenol was used instead of the glycidyl-chlorohydrin ether and glyceryl dichlorohydrin.

The amount of dehydrohalogenating agent used is based on the amount required to dehydrohalogenate the dichlorohydrin ether and the monochlorohydrin ether, and also to dehydrohalogenate the epichlorohydrin to the extent required to effect its reaction with the dihydric phenol. When the glycidyl chlorohydrin ether of a dihydric phenol is used, the amount of dehydrohalogenating agent should be sufficient also to effect its dehydrohalogenation.

In the chlorohydrin ethers which are used in the process, most of the chlorine is active chlorine, while some small amount of the chlorine may be present as inactive chlorine. These terms, as used in the following examples, are defined as follows:

The active chlorine is defined as the chlorine on a carbon atom adjacent to a carbon atom containing a hydroxyl group, as follows:

(1) 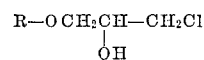

This compound is easily dehydrohalogenated to give an epoxide compound.

Inactive chlorines are formed by the addition of epichlorohydrin to the hydroxyl group in the above compound.

(2) 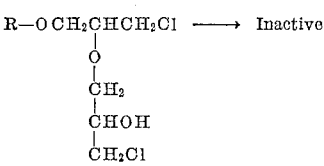

The above labeled chlorine cannot be removed to form an epoxide group since no hydroxyl is present on an adjacent carbon.

High molecular weight dihydric phenols and high molecular weight resins, including resins free from epoxide groups and epoxide resins containing epoxide groups, can be prepared, which vary in molecular weight over a wide range by varying the proportions of the reactants used.

Thus, a high molecular weight polmeric resin free from epoxide groups is produced by the recation of 1 mol of the dichlorohydrin ether with 1 mol of monochlorohydrin ether and 1 ml of dihydric phenol, with 3 mols or slightly more of caustic alkali as dehydrohalogenating agent to produce a product which can be considered to have the following formula:

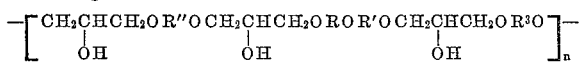

in which R″ is the residue of the polyhydric alcohol, R is the residue of the dihydric phenol from the monochlorohydrin ether, R′ is a divalent radical containing at least 2 carbon atoms selected from the group consisting of aliphatic hydrocarbon groups, hydroxy-substituted aliphatic hydrocarbon groups, and hydroxy-substituted hydrocarbon ethers of aliphatic hydrocarbon groups, $R^3$ represents the residue of the added dihydric phenol, and $n$ represents the degree of polymerization.

While the polymerization tends to go to an indefinite length, the molecular weight stays in a workable range due to decreased functionality caused by the presence of inactive chlorine.

If equimolecular proportions are used with less than the amount of caustic required for dehydrohalogenation, a polymeric product is produced which will be terminated by chlorohydrin groups at one end of the molecule and phenolic hydroxyl groups at the other.

The proportions of the monochlorohydrin ether can be varied from less than 1 mol to several mols for each mol of the dichlorohydrin ether. But the amount of added dihydric phenol should be equal, mol for mol, to the dichlorohydrin ether for the production of high molecular weight polymeric products such as above referred to. Less than the theoretical amount of caustic alkali can be used as dehydrohalogenating agent to control the polymer size.

A valuable type of product can be produced by the present process which are high molecular weight dihydric phenols. One of the simpler types of dihydric phenols is produced by the reaction of 1 mol of dichlorohydrin ether, 1 mol of monochlorohydrin ether and 2 mols of dihydric phenol. In general, if $n$ is the number of mols of dichlorohydrin ether, there should be $n$ plus 1 mols of dihydric phenol, and the mols of monochlorohydrin ether may vary from less than 1 to a much larger number. The amount of alkali required for dehydrohalogenation should be equal to the chlorohydrin groups of the dichlorohydrin and monochlorohydrin ethers or slightly in excess thereof.

An illustrative formula of dihydric phenols formed is the following:

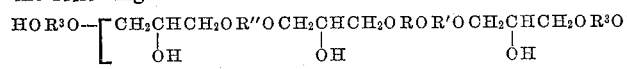

in which R, R′, R″ and $R^3$ have the same meaning above indicated and $x$ is 1 or more.

The molecular structure of the polyhydric phenols will vary somewhat with the proportions of the reagents. The terminal phenolic hydroxyl group may be either that from the added dihydric phenol or it may be the free phenolic hydroxyl group of the monochlorohydrin ether. The free phenolic hydroxyl groups of the added dihydric phenol and of the monochlorohydrin ether are only in part reacted with the epoxide groups formed by dehydrohalogenation of the dichlorohydrin and monochlorhydrin ethers. Each of the two chlorohydrin groups of the dichlorohydrin ether can react, on dehydrohalogenation, with a phenolic hydroxyl of the added dihydric phenol or with the phenolic hydroxyl of the chlorohydrin ether. Similarly, the chlorohydrin group of the monochlorohydrin ether, on dehydrohalogenation, will form an epoxide group which can react either with a phenolic hydroxyl of the added dihydric phenol or with the phenolic hydroxyl of another monochlorohydrin ether molecule. In order to produce the dihydric phenols, the number of phenolic hydroxyl groups should be in excess of the chlorohydrin ether groups.

The dihydric phenols produced as above described can advantageously be used as dihydric phenols in the production of epoxide resins by further reacting them, in a second step of the process, with epichlorohydrin and caustic alkali to produce epoxide resins with terminal glycidyl groups.

In the modified form of the process in which epichlorohydrin is also used, in addition to the dichlorohydrin ether, the monochlorohydrin ether and dihydric phenol, and with an amount of dehydrohalogenating agent sufficient to effect dehydrohalogenation, epoxide resins can be directly produced by a one-stage process.

One of the simplest forms of epoxide resins produced from 1 mol of the dichlorohydrin ether, 1 mol of the monochlorohydrin ether, 1 mol of dihydric phenol and 1 mol of epichlorohydrin can be considered as having the following formula:

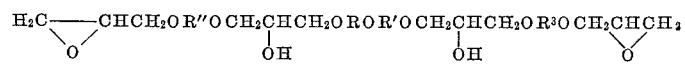

in which R, R′, R″ and $R^3$ have the meaning above indicated.

The proportions of the four ingredients which are reacted and subjected to the dehydrohalogenation treatment can be varied, but, in general, the number of chlorohydrin groups should be in excess of the number of phenolic hydroxyl groups in the reactants to produce a product having terminal epoxide groups.

Somewhat more complex products are produced when the glycidyl chlorohydrin ether of a dihydric phenol is used in addition to the dihydric phenol.

Depending upon the proportions used of the ingredients, the products produced will be dihydric phenols, where the number of phenolic groups in the mixture is in excess of the number of chlorohydrin groups, and epoxide resins will be produced where the number of chlorohydrin groups in the ingredients is in excess of the number of phenolic hydroxyl groups.

Thus, complex dihydric phenols can be produced where the ingredients contain an excess of phenolic hydroxyl groups, in which case the terminal portions of the molecule will be the residues of either the dihydric phenol or the phenolic group of the dichlorohydrin ether, or in part each of these groups. The residues of the other reactants will form intermediate portions of the molecule and may vary in their arrangement in the molecule and in different molecules in the same product.

When an excess of chlorohydrin groups is present in the reaction mixture, and epoxide resins are produced, the terminal epoxide group will be either a glycidyl group formed from one of the chlorohydrin groups of the dichlorohydrin ether, or formed from the chlorohydrin group of the monochlorohydrin ether, and, where epichlorohydrin or the glycidyl chlorohydrin ether of a dihydric phenol is used, the terminal glycidyl group may be that of such ether or formed from the chlorohydrin group of such ether or from the epichlorohydrin. The terminal epoxide or glycidyl groups may be in part formed from 2 or more of such reactants. In such cases, the intermediate portions of the long molecules of the high melting point resins will be made up of the residues of the other reactants in proportions which may vary in different molecules of the same reaction product.

Where the mixture of reactants contains an equal number of chlorohydrin groups and of phenolic hydroxyl groups, a high molecular weight polymeric product is produced which tends to go to an indefinite length but stays in a workable range due to decreased functionality caused by the presence of inactive chlorine.

In the above formulae, it is assumed that the chlorine of the chlorohydrins used is active chlorine. But to the extent that inactive chlorine is present, the structures will be somewhat modified from those illustrated by the above formulae.

The products produced by the present process, and the variations in the process, are composite products of a distinctive nature in that they contain the residues of the reactants used combined through ether linkages and with terminal groups which vary in different products, e.g., phenolic hydroxyl groups in the case of the dihydric phenols, and epoxide or glycidyl groups in the case of the epoxide resins.

The following description and examples further illustrate the invention, but it will be understood that the invention is not limited thereto.

Examples 1 to 7 illustrate the production of the dichlorohydrin ethers of the polyhydric alcohols.

Example 1

To a one liter flask equipped with stirrer, thermometer, condenser and addition tube was added 180 grams (2 mols) of 1,4-butanediol and 1 cc. of $BF_3$ etherate (47% $BF_3$). This solution was heated to 60° C. where dropwise addition of 370 grams (4 mols) of epichlorohydrin was begun. The epichlorohydrin was added over a period of two hours and fifteen minutes, the temperature being controlled between 60–70° C. by external cooling. After the exothermic reaction was over, the temperature was raised to 75° C. to insure complete reaction. This product analyzed 20.9% active chlorine, 25.8% total chlorine.

Example 2

To a one liter flask equipped as in Example 1, was added 307 grams (2.29 mols) of trimethylol propane. The temperature was raised to 56° C. to melt the TMP, at which point heat was removed and 1 cc. of $BF_3$ etherate was added. Dropwise addition of epichlorohydrin, 424 grams (4.58 mols) was begun and continued over a period of three hours. The temperature of the exothermic reaction was controlled between 60–70° C. by external cooling and rate of epichlorohydrin addition. This product had an active chlorine content of 19.2%, total chlorine 22.2%.

Example 3

To a one liter flask, equipped with condenser, stirrer, and thermometer was added 300 grams (½ mol) of Polyethylene Glycol 600 and 92.5 grams epichlorohydrin (1 mol). When solution was attained, 1 cc. of $BF_3$ etherate was added. The temperature of the reaction was controlled between 25–35° C. for three hours and then was raised to 50° C. to insure complete reaction. The product contained 8.2% active chlorine, 9.0% total chlorine.

Example 4

In a similar manner, the dichlorohydrin ether of Polyethylene Glycol 750 was produced containing 6.5% active chlorine and 7.6% total chlorine.

Example 5

In a similar manner, the dichlorohydrin ether of Polypropylene Glycol 1200 was produced with 5.14% active chlorine and 5.14% total chlorine.

Example 6

In a similar manner, the dichlorohydrin ether of Polypropylene Glycol 400 was produced with 10.04% active chlorine and 12.1% total chlorine.

The following example illustrates the production of a dichlorohydrin ether of a dihydric alcohol, containing intermediate aromatic groups such as the dihydroxydiethyl ether of bisphenol prepared by the reaction of 2 mols of ethylene chlorohydrin with 1 mol of bisphenol with the use of caustic soda as a condensing or dehydrohalogenating agent.

Example 7

To a two liter flask equipped with a condenser, thermometer, stirrer and dropping funnel was added 616 grams of the di(hydroxyethyl) ether of bisphenol (2 mols based on percent OH=11.05). This material was heated to 100° C. in order to melt it and 25 grams of epichlorohydrin was added to it. At 79° C. 1 cc. of $BF_3$ etherate (47% $BF_3$) was added. The reaction exothermed to 83° C. Gradual addition of epichlorohydrin was begun at this point. The temperature was controlled between 80–85° C. by the rate of epichlorohydrin addition and by the application of an external cold water bath. All the epichlorohydrin (370 grams—4 mols) was added over a period of one hour. Five grams of water was then added. This material analyzed as containing 10.9% active chlorine, 14.4% total chlorine.

The production of the monochlorohydrin ethers, and of intermediates in their production, is illustrated by Examples 8 to 15. Examples 8 and 9 illustrate the production of the monohydroxyethyl ether of bisphenol by two different processes.

Example 8

To a five liter flask equipped with a condenser, stirrer, and thermometer, was added 1140 grams (5 mols) of bisphenol, 210 grams sodium hydroxide (5 mols+5 wt. percent excess) and 1.5 liters of water. After the bisphenol and sodium hydroxide were dissolved, 407.5 grams (5 mols+1.25 wt. percent excess) of ethylene chlorohydrin was added. The solution was heated to reflux and held there for one hour. On cooling, the product was washed with hot water until neutral to remove the sodium chloride and other water solubles. The water was then removed by heating the material to 160° C. under 29 mm. pressure. The product analyzed 12.55% OH (theoretical 12.5%) in 100% yield (1367 grams).

Example 9

To the same equipment as described in Example 8, 228 grams bisphenol (1 mol) and 93 grams of ethylene carbonate (1 mol+5 wt. percent excess) were added. The mixture was heated to 130° C. to dissolve the bisphenol. Potassium carbonate, 2 grams, was added. The temperature was raised over a period of two hours to 200° C. The product was cooled and reheated to 150° C. under 70 mm. pressure. The product analyzed 12.65% OH in 100% yield (274 grams).

The compounds of Examples 8 and 9 were dark amber colored amorphous materials that were very viscous liquids at room temperature.

The hydroxyethyl ethers of resorcinol are prepared in a similar manner and are dark, viscous, amorphous liquids at room temperature.

The hydroxyethyl ethers of other dihydric phenols such as hydroquinone, 4,4'-dihydroxy diphenyl sulfone, etc. may be similarly prepared.

Other hydroxyalkyl ethers of dihydric phenols are illustrated by the following examples:

Example 10

To a two liter flask equipped with a mechanical stirrer, thermometer and condenser was added three mols of bisphenol (684 grams), three mols of isopropyl glycidyl ether (348 grams) and one gram of $K_2CO_3$. Heat was applied and the temperature was slowly raised to 150° C. over a period of one hour. When the heat source was removed, the temperature rose to 170° C. in 15 minutes. At this point, the temperature began to fall so heat was applied to 200° C. in thirty minutes. The material was then poured into a can to cool. The product in 100% yield analyzed at 9.9% hydroxyl (theoretical percent OH=9.9).

Example 11

To a two liter flask equipped as in Example 10 was added five moles of resorcinol (550 grams), and five mols of glycerine carbonate (590 grams). The mixture was heated to 130° C. where two grams $K_2CO_3$ was added. The temperature was raised to 190–200° C. and held there for three hours. At the end of this time, gas evolution was very small. The apparatus was then evacuated to 150 mm. pressure and held at this pressure and 190–200° C. for two hours. The product in 99% yield (912 grams) contained 27.0% OH (theoretical—27.7%).

The reaction of the hydroxyalkyl ethers of dihydric phenols with epichlorohydrin in the presence of a $BF_3$ catalyst to form the monochlorohydrin derivative, is illustrated by the following examples:

Example 12

To a one liter flask equipped with condenser, stirrer, thermometer and addition tube was added 408 grams of the monohydroxyethyl ether of bisphenol (1.5 mols) and 1 cc. of $BF_3$ etherate. The temperature was raised to 43° C. where dropwise addition of epichlorohydrin was begun. The epichlorohydrin (139 grams—1.5 mols) was added over a period of forty minutes, the temperature being controlled between 70–80° C. by external cooling. The product contained 8.0% active chlorine, 9.8% total chlorine.

Example 13

By a similar procedure, the monohydroxyethyl ether of resorcinol was converted into a monochlorohydrin ether containing 12.0% active chlorine and 14.0% total chlorine.

Example 14

The glycerine ether of resorcinol was treated in a similar way and gave a chlorohydrin ether with 10.1% active chlorine and 12.8% total chlorine.

Example 15

To a one liter flask equipped with condenser, stirrer, thermometer and addition tube was weighed 344 grams (1 mol) of the reaction product of Example 10. Heat was applied and at 40° C., dropwise addition of epichlorohydrin was begun followed by 1 cc. of $BF_3$ etherate. All the epichlorohydrin, 92.5 grams (1 mol), was added in thirty minutes, the temperature being controlled below 62° C. by external cooling. Ten minutes after the final epichlorohydrin addition, the reaction was complete as evidenced by the drop in temperature. This material contained 6.5% active chlorine, 8.1% total chlorine.

The preparation of the glycidyl chlorohydrin ether of a dihydric phenol, namely, bisphenol, is illustrated by the following example:

Example 16

To a two liter flask equipped with stirrer, thermometer, and reflux condenser was added 10 mols of epichlorohydrin (925 grams), 1 mol of bisphenol and 2 cc. of a 60% solution of benzyl trimethyl ammonium chloride (BTMaCl) in water. This solution was heated with stirring to 110° C. where a slight exotherm was encountered. Heat was removed and the exothermic temperature was allowed to rise to 114° C. After 5 minutes when the temperature began to drop, heat was applied to raise the temperature to reflux (118–120° C. pot temperature). After 3 hours at reflux the reaction was complete.

This solution contained one mol of a diphenolic ether, consisting of approximately 50% glycidyl ether groups and 50% chlorohydrin ether groups, unreacted epichlorohydrin (7 mols) and glyceryl dichlorohydrin, equivalent to the glycidyl ether groups of the phenol (1 mol).

The mixed glycidyl-chlorohydrin ether of bisphenol produced as described in this example can be isolated as illustrated by the following example:

Example 17

The solution described in Example 12 was vacuum distilled to a pot temperature of 150° C. at 0.1–0.5 mm. Hg. The resinous product (365 grams) had a wt./e. of 323 and percent Cl of 7.3.

The following examples illustrate the process with varying proportions of the dichlorohydrin ether, of the monochlorohydrin ether and of dihydric phenol, without and with the addition of epichlorohydrin.

Example 18

This example illustrates the reaction of 1 mol each of the dichlorohydrin ether, of the monochlorohydrin ether and of the dihydric phenol to give a high molecular weight polymeric resin.

To a one liter flask equipped with stirrer, condenser, and thermometer was added 182 grams (0.5 mol) of the chlorohydrin ether of the hydroxy ethyl ether of bisphenol, 114 grams (0.5 mol) of bisphenol and 137 grams (0.5 mol) of the dichlorohydrin ether of butanediol and 250 cc. $H_2O$. Heat was applied to mutually dissolve these compounds. At 60° C. a uniform mixture was obtained. Sodium hydroxide, 66 grams (1.52 mols, eq. + 10% excess), dissolved in 500 cc. $H_2O$ was added. The mixture was heated to 100° C. and held there for 30 minutes. The aqueous layer was decanted and the taffy resin was washed with hot water until neutral to litmus, and dried by heating to 150° C.

The product in 93% yield (352 grams) had no epoxide value, percent Cl—2.9. Durran's melting point 67° C., Gardner viscosity (40% non-volatile in butyl carbitol) M.

Example 19

The following example illustrates the production of a high molecular weight resinous dihydric phenol.

Following the procedure described in Example 18, the following reactants were charged into the vessel in the following proportions:

Monochlorohydrin ether of monohydroxy ethyl ether of bisphenol (0.5 mol) 182 grams, bisphenol (1 mol) 228 grams, dichlorohydrin ether of butanediol (0.5 mol) 137 grams, NaOH (1.56) 63 grams, $H_2O$ 5% excess, 750 cc.

The resinous dihydric phenol produced in 94% yield (461 g.) had no epoxide value, a chlorine percentage of 2.4, a Durran's melting point of 61° C., and a Gardner viscosity of F (40% non-volatile in butyl carbitol).

Example 20

This example illustrates the production of an epoxide resin from the dihydric phenol of Example 19 by reaction with an excess of epichlorohydrin and aqueous caustic alkali.

To a one liter flask equipped as described above was added 203 grams (.206 mol) of the dihydric phenol of Example 19 and 462 grams (5 mols) of epichlorohydrin. After solution was reached 17 grams of NaOH (.425 mol) was added. Heat was applied and the reaction mass was brought to reflux and held for 10 minutes. The water was removed by azeotropic distillation, the salts were removed by filtration and the solvent distilled under 40 mm. pressure to 150° C.

The product had a wt./epoxide of 605, Cl=3.1%, Durran's melting point 43° C., and Gardner viscosity of C at 40% non-volatile in butyl carbitol.

Example 21

This example illustrates the production of an epoxide resin by modification of the process of Examples 19 and 20, with production, first, of the dihydric phenol and addition to the reaction mixture, before the product is washed, of epichlorohydrin and additional caustic alkali.

The first part of the process was carried out as in Example 19, but after the dihydric phenol had been produced and before it had been isolated and washed, there was added one mol of epichlorohydrin (92.5 g.), 1 mol of sodium hydroxide (41 g.) and 100 cc. of water, and the further reaction was carried out, as described in Example 20, to produce the epoxide resin.

An epoxide resin was obtained in 99% yield (542 g.) with a weight per epoxide of 3350, 1.8% chlorine, a Gardner viscosity (40% non-volatile in butyl carbitol) of U, and a Durran's melting point of 84° C.

*Example 22*

This example illustrates the production of an epoxide resin by a single stage process in which epichlorohydrin is present along with the other ingredients at the outset, the ingredients and proportions being similar to those above referred to. Additional sodium hydroxide was added along with the epichlorohydrin in the initial charge.

Following the procedure of the preceding examples, the following ingredients were charged into the vessel.

Monochlorohydrin ether of hydroxy ethyl ether of bisphenol (0.5 mol) 182 grams, bisphenol (1 mol) 228 grams, dichlorohydrin ether of butanediol (0.5 mol) 137 grams, epichlorohydrin (1 mol) 92.5 grams, NaOH, 105 grams, (2.625 mols), and 750 cc. of water.

The product obtained was a epoxide resin with a 99% yield (541 g.) and a weight per epoxide of 1486, 1.7% chlorine and a Durran's melting point of 75° C.

By a similar procedure, other dichlorohydrin ethers can be reacted with the same or other monochlorohydrin ethers and with the same or other dihydric phenols in varying proportions to produce either a high molecular weight resin free from epoxide groups, a high molecular weight dihydric phenol, or an epoxide resin.

So, also, the dihydric phenol can be replaced in whole or in part by a glycidyl chlorohydrin ether of a dihydric phenol, or the dichlorohydrin ether can itself be replaced in part by such a glycidyl chlorohydrin ether of a dihydric phenol; and a similar range of modified products can be produced, including epoxide resins, dihydric phenols, and epoxide-free resins.

Where the glycidyl chlorohydrin ether of a dihydric phenol is used, together with additional dihydric phenol, the initial reactants will be the dichlorohydrin ether, the monochlorohydrin ether, the dihydric phenol and the glycidyl chlorohydrin ether, with the use of caustic alkali sufficient to bring about dehydrohalogenation of the chlorohydrin groups. Where the glycidyl chlorohydrin ether is used to replace a part of the dichlorohydrin ether, the ingredients reacted during the dehydrohalogenation process will include all four ingredients, namely, the dichlorohydrin ether, the monochlorohydrin ether, the dihydric phenol and the glycidyl chlorohydrin ether of the dihydric phenol. And the amount of caustic alkali will be sufficient to effect the desired dehydrohalogenation. The products produced, when the glycidyl chlorohydrin ethers are used, include products which are high molecular weight dihydric phenols which can further be reacted with epichlorohydrin to produce epoxide resins; epoxide resins directly produced from the reactants in proportions in which the glycidyl groups are in excess of the phenolic hydroxyl groups, and high molecular weight epoxide-free resins where the chlorohydrin and phenolic hydroxyl groups are in equal proportions.

The epoxide resins produced by the present process are aliphatic modified epoxide resins which can be used in coating compositions and for other purposes, including esterification with drying oil or other acids to form drying esters or other esters or by reaction with cross-linking agents such as amines and polyamines, di-isocyanates, amine-aldehyde and phenol-aldehyde resins, etc., to form complex or insoluble products.

The new epoxide resins are useful as or in coating compositions to form films or coatings which can be cured with amine or other epoxide resin curing agents.

The dihydric phenols produced by the present process can be used as dihydric phenols and subjected to further reaction, e.g., by esterification through the alcoholic hydroxyl groups, or by cross-linking through the aliphatic hydroxyl groups with cross-linking agents such as di-isocyanates, etc., and they can be cross-linked or reacted through their terminal phenolic hydroxyl groups, e.g., with polyepoxides, to form cross-linked products or with epichlorohydrin to produce epoxide resins.

The high molecular weight polymeric products which are free from epoxide groups can be used in admixture with other resins or esterified through their alcoholic hydroxyl groups or used with cross-linking reagents which will cross-link the resins through their aliphatic hydroxyl groups.

Where these resins contain terminal phenolic hydroxyl groups, they can be further reacted with epichlorohydrin to form epoxide resins.

We claim:

1. The method of producing aliphatic modified high molecular weight dihydric phenols and resins which comprises forming a mixture of a di(chlorohydrin) ether of a polyhydric alcohol, a monochlorohydrin ether of a hydroxy-aliphatic ether of a dihydric phenol, and a dihydric phenol, and subjecting the mixture to a dehydrohalogenation reaction with an alkaline dehydrohalogenating agent, said monochlorohydrin ether containing an unreacted phenolic hydroxyl group and said mixture containing for each mol of di(chlorohydrin) ether of a polyhydric alcohol, about ½ to 20 mols of the monochlorohydrin ether and about ½ to 2 mols of the dihydric phenol.

2. The method of producing dihydric phenols and epoxide and non-epoxide resins which comprises forming a mixture of (1) a di(chlorohydrin) ether of a polyhydric alcohol having the following formula

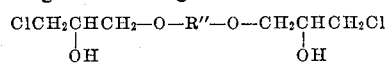

in which R'' is a divalent residue of a polyhydric alcohol obtained by removing the hydroxyl groups, (2) a monochlorohydrin ether of hydroxyalkyl and hydroxy-aliphatic ethers of a dihydric phenol, in an amount equivalent to from about ½ to 20 mols for each mol of the di(chlorohydrin) ether of a polyhydric alcohol, having the following general formula

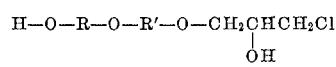

in which R is the aromatic nucleus of a dihydric phenol and R' is a divalent radical containing at least 2 carbon atoms selected from the group consisting of aliphatic hydrocarbon groups, hydroxy-substituted aliphatic hydrocarbon groups, hydrocarbon ether-substituted aliphatic hydrocarbon groups, and hydroxy-substituted hydrocarbon ethers of aliphatic hydrocarbon groups, and (3) a dihydric phenol in an amount equivalent to from about ½ to 2 mols for each mol of the di(chlorohydrin) ether of a polyhydric alcohol, and subjecting the mixture to a dehydrohalogenation reaction with an alkaline dehydrohalogenating agent.

3. The method of producing dihydric phenols in accordance with claim 2 in which the phenolic groups of the monochlorohydrin ether and of the dihydric phenol are in excess of the chlorohydrin groups of the monochlorohydrin and di(chlorohydrin) ethers.

4. The method of making high molecular weight resins in accordance with claim 2 in which the chlorohydrin groups and the phenolic hydroxyl groups of the reactants are substantially equal.

5. The method of producing epoxy resins in accordance with claim 2 in which the chlorohydrin groups of the di(chlorohydrin) and monochlorohydrin ethers are in excess of the phenolic hydroxyl groups of the monochlorohydrin ether and of the dihydric phenol.

6. The method of producing epoxy resins in which the dihydric phenols produced in accordance with claim 3 are further reacted with epichlorohydrin in admixture with caustic alkali.

7. The process according to claim 2 in which a glycidyl chlorohydrin ether of a dihydric phenol is also mixed therewith during the dehydrohalogenation reaction.

8. Products produced in accordance with the process of claim 1.

9. Products produced in accordance with the process of claim 2.

10. Dihydric phenols produced in accordance with the process of claim 3.

11. High molecular weight resins produced in accordance with the process of claim 4.

12. Epoxy resins produced in accordance with the process of claim 5.

13. Epoxy resins produced in accordance with the process of claim 6.

14. Products produced in accordance with the process of claim 7.

References Cited in the file of this patent
UNITED STATES PATENTS

| | | |
|---|---|---|
| 2,456,408 | Greenlee | Dec. 14, 1948 |
| 2,581,464 | Zech | Jan. 8, 1952 |
| 2,712,000 | Zech | June 28, 1955 |